Jan. 12, 1965   E. T. ANGUS ETAL   3,165,679
MEASURING APPARATUS FOR DETERMINING THE EXTENT AND SENSE OF
RELATIVE MOVEMENT OF ONE OBJECT WITH RESPECT TO ANOTHER
Filed March 8, 1961
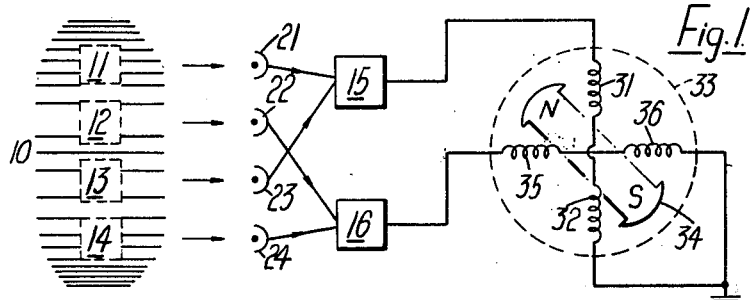
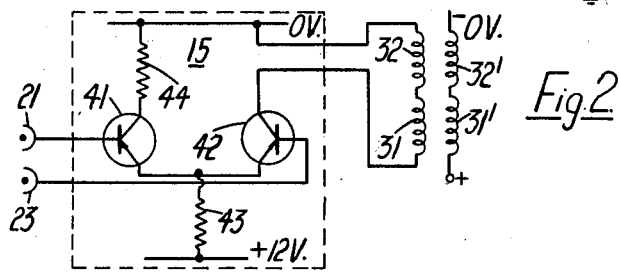
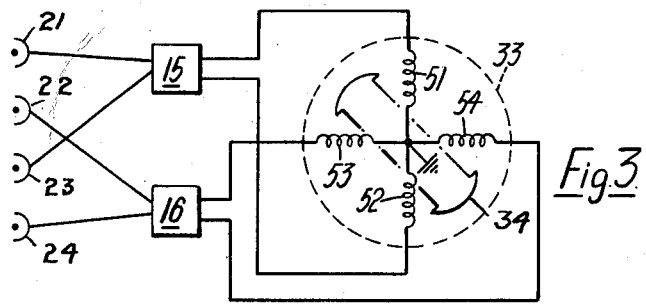
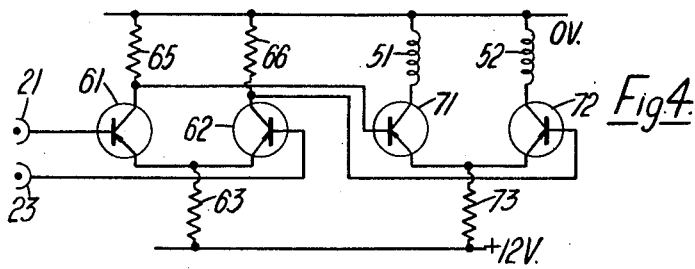
Inventors
E. T. ANGUS
A. T. SHEPHERD
D. T. N. WILLIAMSON
By
Cameron, Kerkam & Sutton
Attorneys

United States Patent Office 3,165,679
Patented Jan. 12, 1965

3,165,679
MEASURING APPARATUS FOR DETERMINING THE EXTENT AND SENSE OF RELATIVE MOVEMENT OF ONE OBJECT WITH RESPECT TO ANOTHER
Ernest Thomas Angus and Alexander Turnbull Shepherd, Edinburgh, Scotland, and David Theodore Nelson Williamson, near Wrotham, England, assignors to Ferranti, Limited, Hollinwood, Lancashire, England, a company of Great Britain and Northern Ireland
Filed Mar. 8, 1961, Ser. No. 94,303
Claims priority, application Great Britain, Mar. 11, 1960, 8,585/60
7 Claims. (Cl. 318—27)

This invention relates to measuring apparatus for determining the extent and sense of the relative movement of a first object in one or other of two opposite directions with respect to a second object and is a modification of the invention claimed in United States Patent No. 2,886,-718, hereinafter referred to as the main invention.

In accordance with the main invention, measuring apparatus for determining the extent and sense of the relative movement of a first object in one or other of two opposite directions with respect to a second object includes means for setting up a cyclic wave pattern adapted to move with respect to said second object in dependence on the said relative movement of said first object, first, second, third, and fourth detecting devices adapted during the said movement of the pattern to respond electrically to the conditions of the pattern at first, second, third, and fourth positions respectively, these four positions being fixed with respect to the second object where the conditions at the first and third positions are in approximate counterphase with one another and the conditions at the second and fourth positions are in approximate counterphase with one another, first and second difference stages for deriving electrical signals in sense and quantitive dependence on the vector difference between the signals from the first and third detecting devices and on the vector difference between the signals from the second and fourth detecting devices respectively, said positions being such that said vector differences are out of phase with one another by a fraction of half the cyclic wavelength of the pattern, and further stages for determining the sense of the said relative movement of said first object from the relative phase of the electrical output signals from said difference stages and for determining the extent of said movement from the number of cycles of said output signals which occur during said movement.

In the disclosed embodiments of the main invention the said further stages include a two-way counter which receives over one or other of two input channels, according to the relative phase of the output signals from the detecting devices (as determined by the sense of the movement), a pulse for each cycle, or for each half cycle, of those output signals, and adds the pulses received over one channel and subtracts from the count the pulses received over the other channel. The extent of the movement is therefore represented by the number of pulses, and hence is represented in digital form.

An object of the main invention is to provide apparatus for the purpose stated in which accurate stabilisation of such factors as the brightness of the light which illuminates the pattern, the value of the supply voltage, the sensitivity and dark-current levels of the detecting devices, etc., is rendered unnecessary.

An object of the present invention is to provide apparatus as set forth in the first of the three preceding paragraphs which, whilst substantially fulfilling the object of the main invention as set forth in the preceding paragraph, is modified so that the further stages provide a continuous response rather than a digital one.

Another object is to provide such further stages which are somewhat simpler than those described in the main specification.

In accordance with the present invention, measuring apparatus for the purpose stated includes means for setting up a cyclic wave pattern arranged to move with respect to said second object in dependence on the said relative movement of said first object, first, second, third, and fourth detecting devices arranged to respond electrically during the said movement of the pattern to the conditions of the pattern at first, second, third, and fourth positions respectively, these four positions being fixed with respect to the second object where the conditions at the first and second positions are in quadrature with one another, and the conditions at the third and fourth positions are respectively in counterphase with the conditions at the first and second positions, a synchronous electrical motor of the type in which the angular position of the rotor is determined by the relative conditions of energisation of a plurality of stator windings, the motor being capable of working down to zero frequency, means for so energising those windings by the signals from the four detecting devices as to cause the angular position of the rotor to represent by the extent and direction of its displacement from a datum angular position the extent and direction of said movement of the first object, and response means coupled to the rotor to display or record such movement.

In the accompanying drawings,
FIGURES 1 and 3 are schematic diagrams of two embodiments of the invention,
And FIGURES 2 and 4 are circuit diagrams of parts of the apparatus of FIGURES 1 and 3 respectively.

An embodiment of the invention, as used for indicating the movement of a worktable of a machine tool with respect to the framework of the tool, will now be described by way of example with reference to FIGS. 1 and 2 of the accompanying drawings.

In FIG. 1 the cyclic wave pattern, which is assumed to be of the optical kind (formed, for example, by the combination of two ruled gratings), is represented at 10. The first to the fourth fixed positions are shown at 11 to 14 respectively, with the associated detecting devices in the form of photo-electric cells shown at 21 to 24. The pattern conditions at positions 11 and 12 are in quadrature; the conditions at 11 and 13 are in counterphase; and the conditions at 12 and 14 are in counterphase.

The signals from devices 21 and 23 are applied as input to a difference D.C. amplifier 15 the output of which at any given moment is proportional to the difference between the D.C. levels of those signals at that moment. The signals from devices 22 and 24 are applied to another difference amplifier 16 of similar characteristics.

The output from amplifier 15 is connected to earth by way of two diametrically opposite, series connected parts 31 and 32 of a stator winding of a two-phase synchronous motor 33 having the usual unwound permanent-magnet rotor 34. Similarly the output from amplifier 16 is connected to earth by way of the two diametrically opposite, series connected parts 35 and 36 of the other stator winding of the motor. Rotor 34 is coupled to response means (not shown) arranged to display the extent and direction of the rotor movement from some convenient datum angular position.

In operation, as the wave pattern drifts past the photocells in response to the movement of the worktable, winding 31, 32 is energised in quadrature with winding 35, 36, the direction of the table movement and hence of the pattern movement determining which energising current is the leading one. In response to such energisation the rotor rotates, representing by the extent and direction of its angular movement from the datum position the extent and direction of the movement of the worktable, the response means operating to display that information, by, say, the movement of a pen across a chart.

It will be appreciated that the response of each difference amplifier is independent of any changes in the value of the supply voltage and other factors referred to above, since any such changes affect each detecting device of a pair (21 and 23, or 22 and 24) to an equal extent in the same sense, with the result that the instantaneous values of the input signals to each amplifier are unaffected. The stabilising action of these amplifiers is further described below in relation to a particular arrangement of those amplifiers.

As shown in FIG. 2, amplifier 15 may include two transistors 41 and 42 (see FIG. 2) the emitters of which are connected in common through a resistor 43 to a source of +12 volts. The collectors are connected to a source of zero volts—that is, to earth—through a resistor 44, and through winding 31, 32, respectively. Photocells 21 and 23 are connected to the respective base electrodes.

In order that the energising currents in the windings shall have a true A.C. waveform—that is, shall vary about zero level—it is necessary to eliminate from each current the D.C. component. This may conveniently be effected by supplementing each of winding parts 31, 32, 35, and 36 by an auxiliary winding $31^1$, $32^1$, etc., as the case may be, each of which is wound in the same or in closely adjacent slots as the corresponding part of the main winding and is insulated from it. Windings $31^1$ and $32^1$ (see FIG. 2) are energised in series from some convenient D.C. source so that the flux set up by each just cancels the flux set up by the corresponding main winding part 31 or 32 at the mean value of the energising current from transistor 42. Windings $35^1$ and $36^1$ (not shown) are energised in a similar manner.

In operation, any change of the input signals due to one of the factors specified changes both base potentials equally in the same sense and so changes the common emitter current through resistor 43 as to cause the emitter potentials to follow the base potential changes, thereby leaving the base/emitter potentials substantially unchanged. Thus only second-order changes of the output current of transistor 42 result, and these have no appreciable effect on the energisation of winding 31, 32.

When on the other hand a change occurs in the relative input potential levels on the base electrodes due to a shift of the pattern, the current through resistor 43 and hence the emitter potentials remain unaltered, with the result that the change of the base/emitter voltage of transistor 42 produces an amplified current change in winding 31, 32.

Amplifier 16 may be of similar kind.

In the alternative embodiment shown in FIG. 3, the motor 33 has four windings 51 to 54 arranged as two pairs 51, 52 and 53, 54, each pair having its two windings diametrically opposite one another. Windings 51 and 52 are energised in counterphase with one another from amplifier 15, and windings 53 and 54 from amplifier 16. The low-potential ends of the windings are connected to earth. The operation is sufficiently similar to that of the embodiment of FIG. 1 not to need explanation.

Amplifier 15 of the FIG. 3 arrangement may take the form shown in FIG. 4.

The signals from cells 21 and 23 are respectively applied to the base electrodes of two transistors 61 and 62, the emitters of which are connected in common through a resistor 63 to a source of +12 volts and the collectors of which are connected to a source of zero volts (earth) through load resistors 65 and 66 respectively.

The collectors of transistors 61 and 62 are also connected to the respective base electrodes of two further transistors 71 and 72 the emitters of which are connected in common to the +12 volt source through a resistor 73. The collectors are connected to earth by way of the motor windings 51 and 52 respectively.

The operation is similar to that of the arrangement of FIG. 2, except that an additional stage of amplification is provided, each stage being a difference amplifier to exert the required stabilising action, and the windings are energised in counterphase rather than in phase with one another. It is not necessary in this arrangement to supply extra windings to eliminate the D.C. components of the energising currents as the mean D.C. flux set up by winding 51 is cancelled by that set up by winding 52; and similarly with windings 53 and 54.

The main requirements for the motor are that it should be synchronous, with the lag limited to a low angle, say about 10 degrees, and capable of working down to zero frequency. To give a uniform rotation at such low speeds the pole slots in the stator laminations should be skewed, or the stator pole surfaces left unslotted.

The measuring apparatus of either embodiment accordingly provides a measurement of the tool movement in continuous rather than digital form, whilst being stabilised against changes of the various factors above referred to.

The invention is also particularly applicable to the direct recording of slow variations in the length of metal specimens in extensometry and dilatation.

What we claim is:

1. Measuring apparatus for determining the extent and sense of the relative movement of a first object in one or other of two opposite directions with respect to a second object including means for setting up a cyclic wave pattern adapted to move with respect to said second object in dependence on the said relative movement of said first object and wherein the conditions of the pattern at first, second, third and fourth positions fixed with respect to said second object are so related that the conditions at the first and second positions are in quadrature with one another and the conditions at the third and fourth positions are respectively in counterphase with the conditions at said first and second positions, first, second, third and fourth detecting devices fixed with respect to said second object and operative during the said movement of the pattern to produce electrical signals responsive to and indicative of the conditions of the pattern at said first, second, third and fourth positions respectively, a synchronous electrical motor having a permanent-magnet unwound rotor and a plurality of stator windings of the type in which the angular position of the rotor is determined by the relative conditions of energisation of said windings, the motor being capable of working down to zero frequency, and means for so energising said stator windings by the signals from the four detecting devices as to cause the angular position of the rotor to represent by the extent and direction of its displacement from a datum angular position the extent and direction of said movement of the first object.

2. Apparatus as claimed in claim 1 wherein said means for energising the stator windings include first and second difference stages for deriving electrical signals in sense and quantitive dependence on the vector difference between the signals from the first and third detecting devices and on the vector difference between the signals from the second and fourth detecting devices respectively.

3. Apparatus as claimed in claim 2 wherein said stator windings are two in number and arranged to be energised by the electrical signals from the two difference stages, each to each.

4. Apparatus as claimed in claim 3 wherein each difference stage includes two transistors with a common emitter load, the outputs from the two associated detecting devices being applied to the bases of the transistors, each to each, and the associated stator winding being connected in the collector circuit of one of the transistors, and wherein the apparatus includes means for preventing the setting up of direct-current fields by the stator windings.

5. Apparatus as claimed in claim 4 wherein said last-mentioned means includes for each stator winding an auxiliary winding located and arranged to be energised to set up a direct-current field to counteract a direct-current field set up by the associated stator winding.

6. Apparatus as claimed in claim 1 wherein said stator windings comprise two pairs of windings, the two windings of each pair being located diametrically opposite one another with respect to the rotor axis, the windings of one pair being arranged to be energised in counterphase with one another by the output signals from one of the difference stages, and the windings of the other pair being arranged to be energised in counterphase with one another by the electrical signals from the other difference stage.

7. Apparatus as claimed in claim 6 wherein each difference stage includes an amplifier having two transistors with a common emitter load, the outputs from the two associated detecting devices being applied to the bases of the transistors, each to each, and the collector circuits of the two transistors being applied to drive the two windings, each to each, of the associated pair of stator windings.

References Cited in the file of this patent
UNITED STATES PATENTS

| | | |
|---|---|---|
| 2,358,103 | Ryder | Sept. 12, 1944 |
| 2,599,406 | Mikolic | June 3, 1952 |
| 2,666,357 | Graham et al. | Jan. 19, 1954 |
| 2,857,798 | Seliger | Oct. 28, 1958 |
| 2,886,718 | Shepherd et al. | May 12, 1959 |
| 2,999,967 | Seward | Sept. 12, 1961 |
| 3,098,186 | Williamson | July 16, 1963 |